Aug. 13, 1940.  L. A. CAMEROTA  2,211,318
SHUT-OFF VALVE AND THE LIKE
Filed June 8, 1939
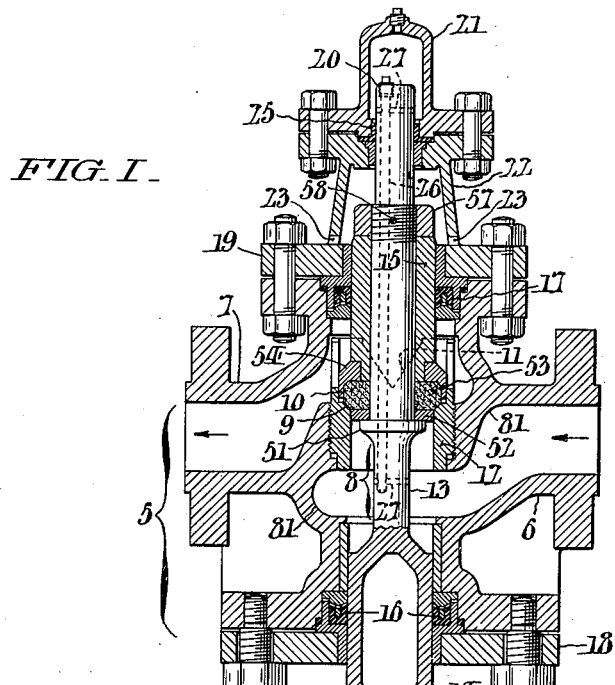
FIG. I.
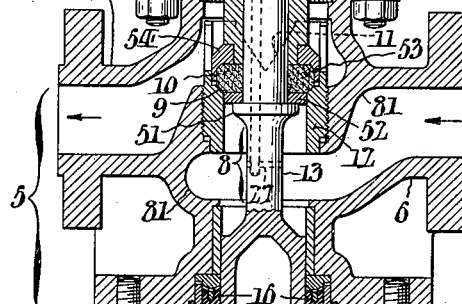
FIG. II.
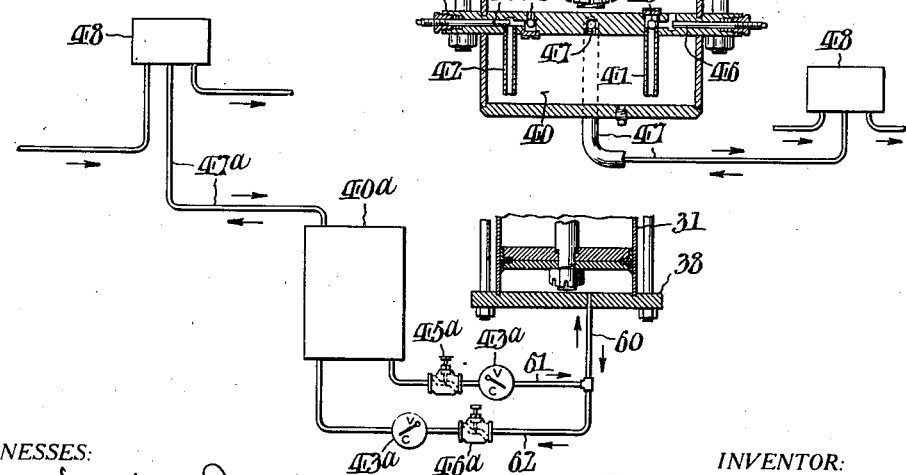
WITNESSES:
Thomas W. Kerr, Jr.
Woodrow Stevenson
INVENTOR:
Louis A. Camerota,
BY Paul & Paul
ATTORNEYS.

Patented Aug. 13, 1940

2,211,318

UNITED STATES PATENT OFFICE 2,211,218

SHUTOFF VALVE AND THE LIKE

Louis A. Camerota, Burlington, N. J., assignor to Florence Pipe Foundry & Machine Company, Florence, N. J., a corporation of New Jersey Application June 8, 1939, Serial No. 278,019

5 Claims. (Cl. 137—139)

This invention relates to valves, and particularly shutoff valves for controlling the flow of fluids. The invention is especially adaptable and advantageous for hydraulic valves, that control water or other inelastic fluid, and in cases where operation of shutoff valves by fluid pressure is desirable. Valves of this character are useful for controlling hydraulic sprays, hydraulic manipulators, mill-tables, screwdowns, presses, and the like.

Valves for such service are often large, and have heretofore been difficult to operate; and they have involved line shock or water-hammer, excessive leakage, and high maintenance cost. When pressure-operated with remote or "pilot" control, they have been complicated in structure, with small orifices liable to clogging by pieces of scale or packing, and with numerous internal packings which were liable to leak without such leakage becoming apparent.

As against these drawbacks of such valves heretofore used, the valve of this invention can be made simple in construction; inexpensive and easy to maintain; free from water-hammer and line shock, or nearly so; and of long life. Various features and advantages of the invention will become apparent from the following description of a species or form of embodiment, and from the drawing. Indeed, all the features and combinations shown or described are of my invention, so far as novel over the prior art.

In the drawing,

Fig. I shows a longitudinal section through a valve device conveniently embodying the invention.

Fig. II is a diagrammatic view of an arrangement for operating the valve device shown in Fig. I by elastic fluid pressure through the medium of a liquid, showing also in longitudinal mid-section a modification of certain parts illustrated in Fig. I.

As shown in Fig. I, the valve device comprises a casing 5 having flanged inlet and outlet connections 6 and 7 forming passages for the fluid to be controlled by the valve 8, and there is a septum 81 across the interior of the casing 5 having therein a port of communication between the passage 6 beneath the septum and the passage 7 above it, with an annular valve seat 9 for the valve head 10 of the valve 8, which coacts with said seat as a poppet valve. The casing 5 may also have a valve bore that communicates with the inlet passage 6 beneath the septum 81 and extends upward above and around the seat 9 substantially or approximately to the top of the casing. The wall of this valve bore is apertured or notched (in a tapering or V-shape) at 11, substantially above the seat 9, for communication between the interior of the bore and the outlet passage 7. Thus the seat 9 is in effect an internal shoulder in the valve bore, intermediate its communications with the passages 6 and 7. The valve head 10 coacts peripherally with the surrounding valve bore wall as a piston valve. Preferably, the annular valve seat 9 is beveled, and the annular surface of the valve head 10, that seats against it, is correspondingly bevelled,—both, as shown to an angle of 45°. As here shown, the valve bore above described is in a removable sleeve 12 which also includes the valve seat 9, and is screwed into its opening in the septum 81, against a shoulder at the lower end of the opening. The sleeve part 12 may be of bronze or other suitable material, such as Monel metal, hardened stainless steel, or the like.

As here shown, the valve member 8 extends through the seat port 9, being reduced at 13 to permit passage of fluid through the port 9 when the valve is open. At opposite sides of the valve seat port 9, the valve member 8 extends out through the lower and upper walls of the casing 5, and these lower and upper portions 14 and 15 of the valve member 8 are enlarged substantially or exactly to the same size as the port 9. As shown, the lower enlarged portion 14 is made hollow, for lightness and economy of material. The valve member 8 is balanced, as regards fluid pressure inside the casing 5 affecting it, in all its longitudinal positions relative to the casing,—whether the valve head 10 is seated and closed, or unseated and opened. As shown, suitable packings 16, 17 are provided at bottom and top of the casing 5 to make the piston portions 14 and 15 of the valve member 8 fluid-tight in their movements. These packings 16, 17 may be held in place by bottom and top cover plates 18, 19 removably bolted to lower and upper flanges on the casing 5.

The valve member 8 may be moved to and fro in the casing 5, to seat and unseat the valve head 10, by fluid-actuated pistons associated with and acting on the outward extending portions 14 and 15 of the valve member.

The upper piston is shown as a plunger consisting of the reduced upper end 20 of the valve member 8 itself, which extends up into a pressure cylinder 21 attached and connected to the cover plate 19 by a hollow conical skirt 22. The differential area of the upper portion 15 of the valve member 8 (due to the reduction in size at 20) may be exposed endwise to atmospheric pressure between the casing 5 and the cylinder 21, by means of openings 23 in the conical skirt 22. The area of the plunger 20 may preferably equal or exceed the (projected) area of the valve seat 9, in order to afford ample force for holding the valve seated. Suitable packing 25 may be provided around the plunger 20 to make it fluid-tight in its movement in the lower end of the cylinder, and may be clamped in place between a flange on the skirt 22 and a flange on the lower end of the cylinder 21 proper.

Pressure fluid for actuating the piston or plunger 20 of the valve member 8 may be suitably supplied to the cylinder 21 to close the valve head 10 on its seat 9 when desired. For this purpose, pressure from any suitable source may be constantly admitted to said cylinder 21, as through a longitudinal duct 26 bored in the valve member 8 and open at its upper and lower ends (through suitable cross bores 27) into the cylinder 21 and into the inlet passage 6 of the valve casing 5.

The lower piston 30 for actuating the valve member 8 operates in a cylinder 31 which may be attached and connected to the valve casing 5 by stud-bolt columns 32 forming extensions of the bolts which secure the cover plate 18 to the casing 5, and taking through the upper end plate or head 33 of the cylinder 31. The piston 30 has a rod 35 extending through said end plate 33 and adapted to engage endwise against the end of the lower portion 14 of the valve member 8. As shown, there is a cap 36 secured on the upper end of the piston rod 35 and flared outward at its bottom to shelter the rod and its opening through the cylinder end 33 against any drip from the parts above. Above the piston 30, the upper end of the cylinder 31 may be open to the atmosphere through a hole or port 37. The lower cylinder head or end plate 38 may be connected to the upper head 33 by tension rods 39.

The piston 30 may be actuated by pressure fluid (preferably oil or other liquid) introduced into the lower end of the cylinder 31 beneath the piston. As shown in Fig. I, provision is made for the use of elastic fluid pressure, such as compressed air, for imposing pressure on the oil. For this purpose, there is an oil and air chamber 40 attached to the lower cylinder head 38, and communication between this chamber and the lower end of the cylinder 31 is provided for through ducts 41, 42, formed partly in the cylinder end plate or head 38 and partly by tubes extending down nearly to the bottom of the chamber 40. These ducts 41, 42 are provided with check valves 43, 43 and with screw-threaded needle or regulator valves 45, 46. One check valve 43 closes downward, whereas the other check valve closes upward.

Air pressure from any suitable source may be supplied and vented to and from the chamber 40 through a pipe 47 connected and opening through the lower side of the plate 38, above the oil in the chamber, under the control of an admission and exhaust valve 48 with suitable fluid supply and exhaust connections. The air pressure must be so correlated with the area of the lower piston 30 and with the area of the upper piston 20 and the (constant) pressure thereon that the upward pressure on the lower piston 30 can overcome the downward pressure on the upper piston 20 (as well as the weight of the valve 8) and open the valve. As shown, the lower piston 30 is very much larger than the upper piston 20, allowing the use of an operating pressure in the cylinder 31 substantially lower than that in the cylinder 21.

As shown in Fig. I, the valve member 8 is of built-up construction, comprising an integral main axial part (preferably of manganese bronze) including the enlarged hollow lower portion 14 as well as the reduced portion 13, and having a shoulder 51 above the latter; a series of annular or cylindrical members 52, 53, 54, 15 mounted on the cylindrical shank of the main axial part above the shoulder 51; and a (castellated) nut 57 (for clamping the parts together) screwed on the upper end of said shank and suitably locked, as by a pin 58. The member 52 is shown as a flat ring resting on the shoulder 51 and substantially fitting the internal bore of the valve seat port 9. The member 53 is shown as a doubly-beveled reversible disc of composition, hard enough to resist the pressure carried, but yet soft enough to squeeze into any imperfections in the seat 9 and produce a leakproof seal. The member 54 is shown as a ring whose outer periphery engages the bore of sleeve 12, and whose lower side is recessed to accommodate the upper portion of the member 53. This member 54 fits around the reduced lower end of the member 15 forming the upper enlarged portion of the valve member 8, and engages the lock nut 57. The parts 53, 54 may be of bronze, or of Monel metal, or of hardened stainless steel, or of any other material best adapted to conditions of service, while the part 15 may be of the same material as the main axial part of the valve member.

It will be seen that the valve head 10 closes against the flow through the seat port 9, so that there is no tendency for it to slam against the seat in closing. During the closing movement of the valve head 10, its periphery coacts with the bore of the sleeve 12 as a piston valve, progressively overtravelling its openings 11 and reducing the flow, and eventually cutting off such flow altogether as it passes the bottoms of the openings 11 above the seat 9. This, it will be seen, happens appreciably before the valve head 10 reaches the seat 9 and seats against it as a poppet valve, so that there is no flow across the (bevelled) contact surfaces as the valve head closely approaches the seat and finally seats against it, and hence no cutting or scoring of these contact surfaces. Hence, the final poppet seating of the valve head 10 on the seat 9 produces a drop-tight seal, because the contact surfaces are never subjected to the scoring and cutting action of a thin stream of liquid at high velocity, and because the soft, resilient packing 53 squeezes into any little scratches or inequalities of the seat 9. Owing to the taper or V-shape of the openings 11, the progressive reduction of flow through the valve casing as the valve head 10 overtravels them takes place at a diminishing rate,—corresponding more or less closely to a sine curve,—and the flow and velocity of the water in the line is reduced in a similar manner. At the moment of final shut-off by this piston action of the valve head 10, the flow and momentum of the liquid in the line are virtually nil, so that there is a minimum of hammer or shock.

When the valve starts to open, the valve head 10 moves away from the seat 9 a substantial distance before it reaches the openings 11 and starts to uncover them. There is, then, no period during which the pressure difference across the valve seat 9 amounts to virtually the full inlet pressure, as in ordinary hydraulic valves of poppet type. Accordingly, the flow across the contact surfaces of valve head 10 and seat 9 is small in proportion to the annular area available for it, and hence the fluid does not have sufficient velocity to cut or score these surfaces. By the time the openings 11 are so far uncovered as to afford an area equal to that of the port 9, the annular area between the valve head 10 and the seat 9 is as great as this or even greater, so that the pressures in inlet 6 and outlet 7 are substantially or nearly equalized, and the velocity of flow is too low to damage the contact surfaces.

Not only is there no tendency for the valve head 10 to slam shut,—owing to the fact that it closes against the flow,—but the check valves 43 and the regulator valve 45 afford definite means of preventing such slamming, since by suitable adjustment of the regulator 45, the rate of escape of fluid from beneath the piston 30 can be controlled to make the valve close just as slowly as desired. As the valve 8 opens against the constant pressure in the cylinder 21, it cannot jump open as if its movement were totally unresisted; and the check valves 43 and the regulator valve 46 afford means of definitely controlling its rate of opening, just as its rate of closing is controlled by the check-valves 43 and the regulator 45. Thus the valve can be made to open quickly and close slowly (or vice versa): e. g., it may open in 1 sec. and close in 7 sec.

Fig. II illustrates diagrammatically a modified arrangement for applying elastic fluid pressure to liquid for operating the valve. Instead of an oil and air chamber 40 on the lower cylinder head 38, there is a separate oil reservoir and air pressure tank 40a, whose pipe connection 60 to the lower end of the cylinder 31 has parallel branches 61, 62 including check valves 43a, 43a and regulator valves 45a, 46a. The air pipe 47a from the air admission and exhaust valves 48 is connected into the top of the tank 40a, above the oil therein,—just as in Fig. I it is connected into the top of the chamber 40.

In Fig. II, various parts and features are marked with the same reference numerals as in Fig. I (with the addition of a letter where such distinction appears necessary) as a means of dispensing with repetitive description.

Having thus described my invention, I claim:

1. In a fluid actuated valve, the combination with a casing having inlet and outlet passages for the fluid to be controlled, and a seat with a port of communication between said passages, of a valve member movable to and fro through said port and having a valve head for coacting therewith to control the passage of fluid therethrough, and also having portions at opposite sides of said seat extending out through the walls of said casing and of substantially the same size as said port, so that said valve member is balanced as regards fluid pressure in the casing affecting it, and oppositely acting fluid actuated pistons with pressure cylinders therefor associated with said outward extending portions of said valve member for moving the valve member toward and from the said seat, with a duct for pressure fluid constantly connecting one of said passages for controlled fluid in the valve casing with one of said pressure cylinders, whereby said piston is constantly exposed to the fluid pressure in said valve casing passage.

2. The invention as set forth in claim 1 wherein the cylinder for one of said pistons for moving the valve member is a separate cylinder mounted on the casing, and the corresponding portion of the valve member extending out through the casing wall has an area exposed to endwise atmospheric pressure between the casing and said cylinder.

3. The invention as set forth in claim 1 wherein one of said portions of said valve member extending out through the casing wall extends into the corresponding pressure cylinder, which is mounted on the casing, as one of said pistons for moving the valve member, and wherein said duct for pressure fluid for actuating this piston extends through said valve member into said cylinder.

4. The invention as set forth in claim 1 wherein the cylinder for one of said pistons for moving the valve member is mounted on the casing and has a transverse septum dividing its interior into separate piston and liquid-and-air-pressure chambers, with means of communication between said chambers for regulating the passage of liquid between the chambers, and thus controlling the rate of movement of the piston and the valve member.

5. The invention as set forth in claim 1 wherein the cylinder for one of said pistons for moving the valve member is a separate cylinder mounted on the casing, and the piston therein has a rod loosely abutting against said valve member for moving it.

LOUIS A. CAMEROTA.